May 22, 1962 K. R. LUNG 3,035,522
PUMPS
Filed Dec. 11, 1957
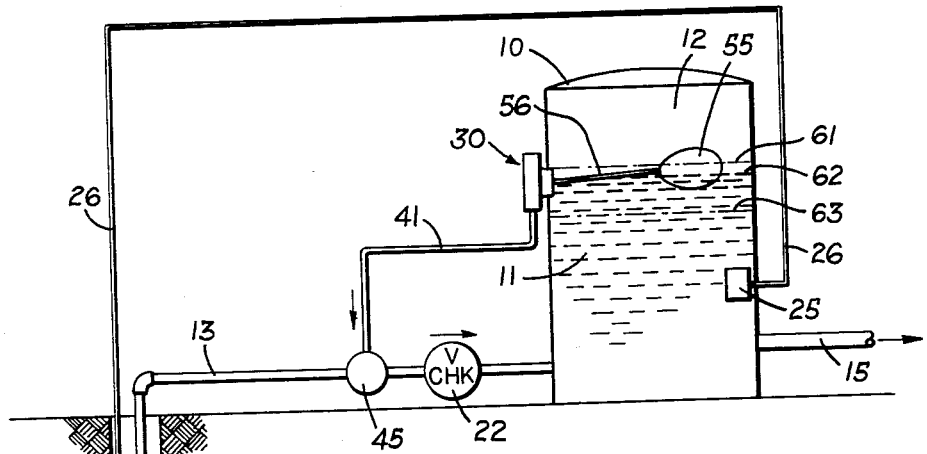
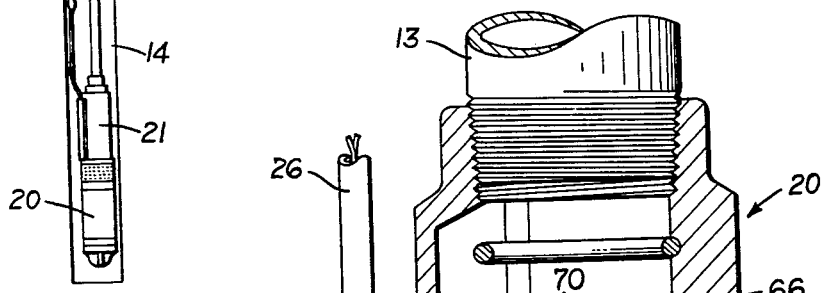
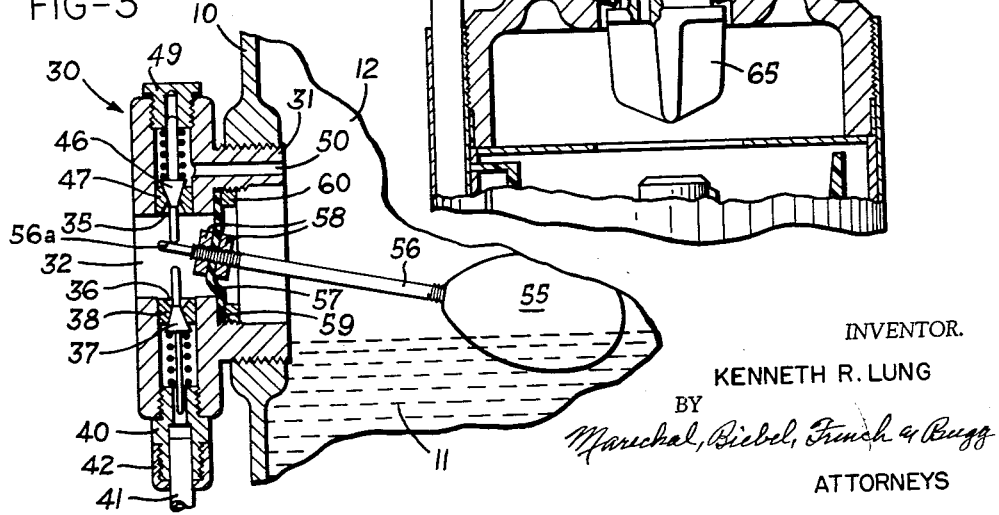
INVENTOR.
KENNETH R. LUNG
BY
Marechal, Biebel, French & Bugg
ATTORNEYS

United States Patent Office 3,035,522
Patented May 22, 1962

3,035,522
PUMPS
Kenneth R. Lung, Dayton, Ohio, assignor to The Tait Manufacturing Company, Dayton, Ohio, a corporation of Ohio
Filed Dec. 11, 1957, Ser. No. 702,143
1 Claim. (Cl. 103—7)

This invention relates to fluid pressure supply systems and more particularly to a domestic water supply system having apparatus for replenishing the supply of pressurized air contained in the storage tank.

Domestic water supply systems normally comprise a storage tank containing water and a supply of air under pressure which provides the operating pressure for moving water from the tank to the point of use. In such systems, air is lost through absorption into the water so that the expandable air cushion over the top of the liquid decreases with consequent loss in the effective pressure being exerted against the water. Also, disregarding loss of air from absorption or leakage, if the amount of gas over the water is small the air pressure capacity is similarly small, a relatively small drop in the level of the water results in a comparatively larger drop in usable air pressure and the pump will then have to cycle more frequently and in response to usage of even a small amount of water.

It is therefore a principal object of this invention to provide a water supply system having apparatus for replenishing the supply of pressurized air contained within the storage tank in a simple and efficient manner through entry of air into the pipe from the pump supplying the tank under control of suitable valve mechanism.

Another object of this invention is to provide a water supply system having the storage tank and a motor driven pump in which the pump permits drainage of the supply pipe when the pump stops and the liquid in the supply tank has fallen to a predetermined level to form a column of air that is then discharged into the reservoir when the pump again goes into operation.

Other objects and advantages of this invention will be apparent from the following description, the accompanying drawing and the appended claim.

In the drawing—

FIG. 1 is a diagrammatic view of a water supply system including a submerged pump according to the present invention;

FIG. 2 is a fragmentary sectional view through a water pump showing one method for draining the supply pipe; and FIG. 3 is an enlarged fragmentary view in vertical section through the valve assembly of FIG. 1.

Referring to FIG. 1 of the drawing, the supply system comprises a closed water supply tank or reservoir 10 receiving a quantity of water 11 with the space above the water level being filled with pressurized air 12. Supply pipe 13 leads from the well 14 into the lower portion of tank 10 to replenish it with water, and an outlet pipe 15 is provided for withdrawing water from the tank. Water is obtained from the well 14 by means of a submersible pump 20 which is driven by motor 21, the motor here constituting an integral part of the pump 20. Reverse flow of water from supply tank 10 down supply pipe 13 and into the well 14 is prevented by means of check valve 22 which is located in the pipe adjacent the tank 10.

The motor 21 can be controlled to operate intermittently, as determined by pressure responsive switch 25 which is operatively connected to the motor and which closes the electric circuit 26 to cause the motor 21 to operate. Pressure switch 25 is regulated to close when the pressure within the tank drops to a predetermined point to start the motor, and to open when the pressure reaches a higher value to stop the motor, in accordance with established practice.

The present invention provides apparatus for supplying the tank 10 with additional air to replenish that lost in use. While air replenishment apparatus have been used on water supply systems in the past, the present apparatus is more simply constructed, cheaper to build, maintain and operate and yet provides accurate and efficient control of the air supply in the tank.

A preferred form of apparatus for replenishing and controlling the air comprises a valve assembly which includes a housing 30 (FIG. 3) attached to the side of supply tank 10 by means of the externally threaded extension 31. Valve housing 30 has a central passage 32 which is open to the atmosphere and opposed vertically extending passages 35 and 36 which extend outwardly from passage 32 to receive valving mechanisms. The lower passage 36 contains a spring biased valve 37 which seats on valve seat 38, and a threaded nipple 40 is received in the outer end of the passage for connection with pipe 41 through coupling 42. The pipe 41 extends from valve housing 30 to a check or snifter valve 45 connected in supply line 13. Check valve 45 permits the flow of air into supply pipe 13 from pipe 41, but precludes the flow of either air or water into pipe 41. Valve 45 does not interfere with the flow of air or water from pipe 13 into the tank by way of the check valve 22.

The other passage 35 in valve housing 30 receives a spring biased valve 46 which seats on valve seat 47. In this instance however, the outer end of passage 35 is closed by a plug 49, and the passage connects to the interior of tank 10, above the normal water levels, through vent opening 50, extending at generally right angles from passage 35 through extension 31. The valve 46 prevents air from escaping from the interior of tank 10 except when it is moved upwardly against the biasing spring.

The operation of the valves 37 and 46 in valve housing 30 is controlled by a float 55 which has a float arm 56 secured to a flexible diaphragm 57 by a pair of nuts 58 which are threaded onto the float arm 56 and tightened against both sides of the diaphragm. The outer edges of the diaphragm 57 are clamped between a shoulder 59 which extends inwardly toward passage 32 from extension 31, and a lock ring 60, the lock ring being urged tightly against diaphragm 57 to insure firm, fluid tight connection of the diaphragm to the valve housing 30.

The arrangement is such that when the liquid level in tank 10 reaches a predetermined upper level, such as up to the level of the dotted line 61 for example, beyond which time the air space is too small for proper operation, the float will be positioned at a relatively high level within the tank 10, and the outer end 56a of float arm 56 extending beyond diaphragm 57 into passage 32 will depress valve 37 from valve seat 38 and allow air to be drawn into pipe 41. When the liquid level is at a lower point such as the full line position 62, the air space is large enough and the end of the float arm no longer contacts the valve 37, thereby allowing the biasing spring to force valve 37 against the seat 38, this being the normal operating condition wherein the float 56 occupies a neutral range with its float arm extension 56a out of contact with both of valves 37 and 46. If the liquid level drops to a predetermined lower level, such as to level 63, the end of float arm 56 will then contact valve 46, moving it away from valve seat 47. When this occurs, the opening 50 is connected to passage 32, and excess air present within the tank 10 will be vented to the atmosphere.

The pump 20 has the supply pipe 13 threaded into the upper end thereof, as shown in FIG. 2, to conduct the water from the well 14 upward to tank 10. The pump contains a foot or check valve 65 working against a rubber sealing ring 66 to stop reverse flow of water back into the well. The valve 65 is provided with a bleeder opening 70 connecting the interior of supply pipe 13 with the well for the purpose of providing for limited flow of water from pipe 13 back into the well.

The bleeder opening 70 permits a controlled slow rate of drainage of water from supply pipe 13. If passage 36 in valve housing 30 has been opened, following raising of the liquid level within tank 10 up to the level 61, as soon as the internal pressure within the tank has been restored, the pump stops and the water level in pipe 13 begins to fall. As it does so, air can enter through the pipe 41 and check valve 45 into the upper end of supply pipe 13, and drainage of fluid from the pipe will continue until the pipe has become filled with air. Upon subsequent operation of the motor 21 and pump 20, the check valve 45 will close to prevent discharge through pipe 41, and the entire column of air will be forced into the interior of tank 10. Obviously if the water level within tank 10 is in such a position that passage 36 is closed, when the pump stops, some water will still escape through opening 70, and a partial vacuum will be created but no appreciable amount of air will be admitted. Hence when the pump starts up again, there will be no recharging of the air in the tank.

The system operates in the following manner. As long as the water level in the tank 10 remains between the predetermined upper and lower limits represented by dotted lines 61 and 63 respectively, the pump supplies additional water to make up for that used and to maintain operating pressure within the tank under the control of pressure switch 25. If however the water level rises above the level 61, the lifting of float 55 will result in the end 56a of the float arm depressing valve 36, thereby opening communication between line 41 and the atmosphere. If the pump should be then operating, there is no immediate effect because check valve 45 prevents flow of fluid from the line 13 into line 41. Upon the termination of such pumping cycle, however, the column of water in line 13 slowly falls due to the bleeding action of port 70, creating a vacuum which is transmitted through check valve 45, and thus drawing in air through line 40 and open valve 36. This will result in substantially filling the pipe with air in place of water so that when the pump starts on its next pumping cycle, it will force this column of air through check valve 22 and into the tank to recharge the body of air 12 therein. After one or more pumping cycles the quantity of air increases sufficiently to force the liquid level below line 61, and thereupon valve 36 will close and the system will operate without additional air recharging.

If, on the other hand, the quantity of air within tank 10 should be greater than that desired, resulting in forcing the liquid level below line 63, the end 56a of the float arm will then open valve 46 and allow direct escape of air from this reservoir to the atmosphere. Obviously this also reduces the pressure within the tank, and upon the next pumping cycle, the pump will force only water into the tank, thereby tending to raise and restore the water level to the desired normal operating range. The system is thus self regulating both as to maintaining proper operating pressure and proper water level within the tank.

The system thus continues to operate with the pump responding to changes in pressure and tending to maintain the pressure within a predetermined range, and with the liquid level being separately regulated to maintain a proper size of air cushion above the level of the liquid at all times. Furthermore the system is simple, economical and reliable and does not require special attention or close adjustment.

While the form of apparatus herein described constitutes a preferred embodiment of the invention, it is to be understood that this invention is not limited to this precise form of apparatus and that changes may be made therein without departing from the scope of the invention which is defined in the appended claim.

What is claimed is:

A water supply system comprising a closed tank adapted to store water in the lower portion thereof and to retain air under pressure above said water, a pump having a supply pipe connected to said tank, means starting and stopping said pump in response to decrease and increase in the pressure within said tank with respect to a predetermined value, a float mounted in sensing relation with the liquid level within said tank, said float having a neutral position corresponding to a predetermined liquid level range, a first valve actuated by said float to effect venting of air from said tank to atmosphere in response to lowering of said liquid level below said range, a line leading from said supply pipe, a check valve cooperating with said line to provide for fluid flow only from said line into said pipe and not in the reverse direction, a second valve controlling communication between said line and the atmosphere and actuated by said sensing float in response to rise of said liquid level above said range to effect venting of said line to atmosphere, and means effecting drainage of said supply pipe while said pump is stopped to provide for introduction of air to said supply pipe by way of said second valve and through said line and said check valve for subsequent delivery to said tank when said pump next starts.

References Cited in the file of this patent

UNITED STATES PATENTS

| | | |
|---|---|---|
| 2,354,811 | Jacuzzi | Aug. 1, 1944 |
| 2,583,060 | Paulsen | Jan. 22, 1952 |
| 2,642,747 | Le Van | June 23, 1953 |
| 2,787,220 | Patterson et al. | Apr. 2, 1957 |
| 2,835,200 | Mann et al. | May 20, 1958 |